A. E. BERGSTROM.
INCUBATOR.
APPLICATION FILED JUNE 17, 1918.
1,349,315.
Patented Aug. 10, 1920.
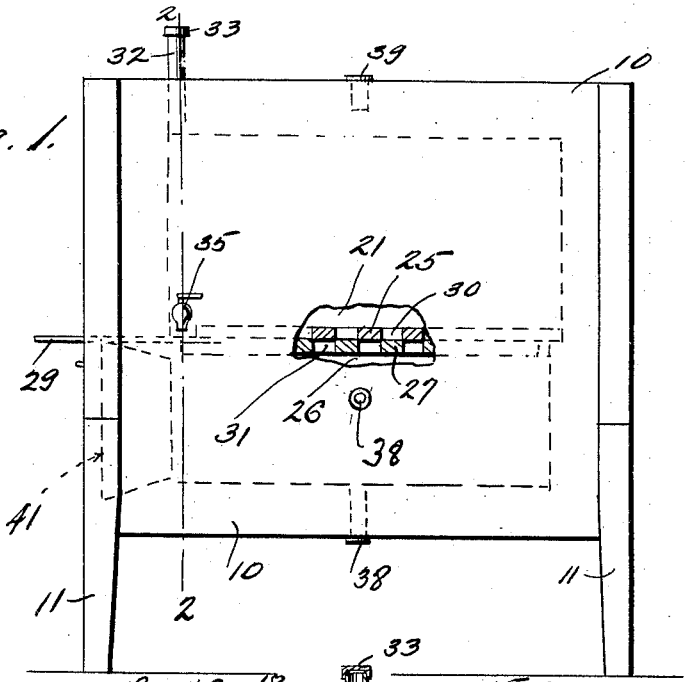
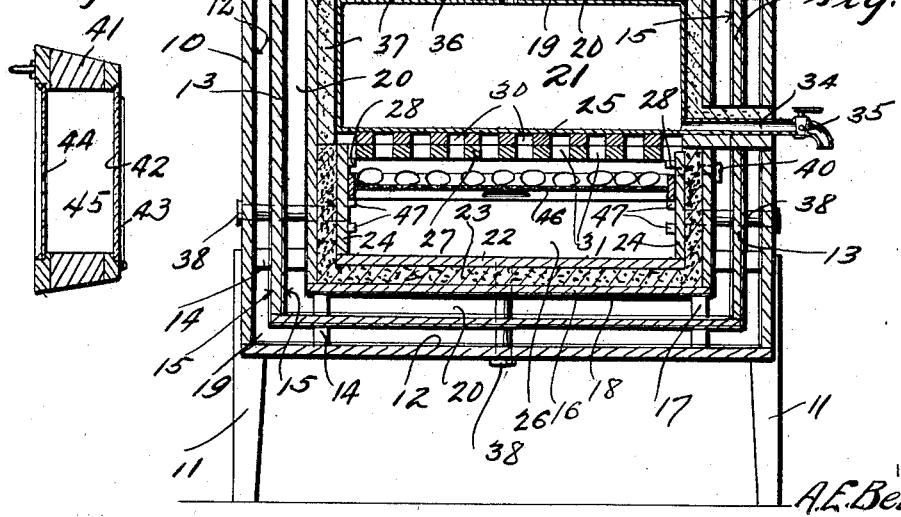
INVENTOR
A.E.Bergstrom
WITNESSES
BY
ATTORNEY

UNITED STATES PATENT OFFICE.

ALFRED E. BERGSTROM, OF SAVAGE, MONTANA.

INCUBATOR.

1,349,315.  Specification of Letters Patent.  Patented Aug. 10, 1920.

Application filed June 17, 1918. Serial No. 240,457.

*To all whom it may concern:*

Be it known that I, ALFRED E. BERGSTROM, a citizen of the United States, residing at Savage, in the county of Richland and State of Montana, have invented certain new and useful Improvements in Incubators, of which the following is a specification.

This invention relates to incubators and has for its object to provide an incubator which shall be simple in construction; the interior readily accessible for the insertion and removal of eggs and young chicks; which is maintained at the proper temperature without the use of fire in close proximity to the apparatus and which is fitted with a room or compartment for the young chicks immediately upon emerging from the shell.

With these objects in view, together with others which will appear as the description proceeds, the invention resides in the novel formation, combination, and arrangement of parts, all as will be described more fully hereinafter, and illustrated in the accompanying drawings, in which:

Figure 1 is an end elevation of the incubator with a portion broken away.

Fig. 2 is a vertical sectional view on the line 2—2 of Fig. 1, and

Fig. 3 is a cross sectional view of the door by which entrance is gained to the interior of the incubator.

In the drawing, 10 indicates the casing of the incubator here shown as of box-like form of any desired dimensions, supported a short distance above the floor upon legs 11. The casing 10 is preferably made of wood covered interiorly on all sides by deadening felt 12, or similar material to prevent the radiation of heat outwardly through the casing. As a further protection against the loss of heat, the casing is lined on all sides by thin boards 13, forming an intermediate casing spaced from the outer casing by blocks 14 and covered on both sides by felt or like material 15. In addition to the intermediate casing 13, there is an inner casing 16 similar to the intermediate casing, spaced therefrom by blocks 17. As thus constructed the casing 10 with its linings 13 and 16, covered by felt and separated by air spaces 19 and 20 provide a non-radiating chamber which can be maintained at the proper temperature for a considerable length of time without loss of heat by water heated to the proper degree and filling a tank 21 within the incubator, as will be referred to more particularly hereinafter.

The inner casing 16 has an additional lining 22 on the floor or bottom thereof spaced from the floor by non heat radiating material such as sawdust 23. This lining is continued up the sides of the inner casing 16 for about one half its height, as at 24, and spaced from the walls of the casing by sawdust. Upon the top edges of the side linings 24 is secured a horizontal partition 25 which divides the interior of the incubator into an upper chamber which is entirely filled by the water tank 21 and a lower chamber 26 for the egg tray which also is a compartment for the newly hatched chicks. The partition 25 has numerous equally spaced perforations 30 formed therethrough for the passage of heat from the hot water tank 21 situated above the partition. Below the partition 25 and in contact therewith is a sliding board or plate 27, supported on cleats 28 fixed against opposite sides of the lining 24, and movable relatively to the partition 25 by an arm 29 projecting through the front of the incubator. Openings 31 are formed in the sliding board and similarly spaced to the openings 30 so that the two sets of openings may be made to register when the greatest amount of heat is to be admitted from the hot water tank to the compartment 26, the degree of heat being lessened by moving the board to close the openings to the extent desired.

The tank 21, which rests directly upon the partition 25, is made of sheet metal and fitted with a tube 32 extending upwardly from its top through the top of the incubator into which hot water is to be poured to fill the tank, a cap 33 being provided to cover the tube after the tank has been filled. On one side of the tank at the bottom thereof is an outlet pipe 34 that extends through the casing and is furnished on its outer end with a valve or faucet 35 for withdrawing the water from the tank. The top, sides and ends of the tank are preferably covered with non-radiating felt 36 over which a layer of plaster of Paris is then applied that fills the narrow space between the tank and the inner wall of the lining 16, the plaster of Paris serving the double purpose of holding the tank in position and reducing radiation from the sides covered. Preferably the plaster of Paris extends upwardly around the tube 32 to the top of the casing and also around the outlet pipe 34.

Ventilation for the interior of the incubator is secured by means of several inlet pipes 38 which pass through the walls and bottom of the casing into the compartment 26 and one or more outlet pipes 39 opening into the interior air space 20 between the inner and intermediate linings 16, 13, which air space is connected with the compartment 26 by one or more ventilating tubes 40 just under the partition 25.

The front of the compartment 26 is fitted with a door 41 having an inner glass panel 42 against which is placed a thermometer 43 which is visible from the outside of the incubator through the outer glass panel 44. These two glass panels are separated by an air space 45 to prevent undue radiation.

46 indicates the egg tray comprising an open frame covered with reticulated material such as woven wire having several openings therein at the front for the newly hatched chick to drop through into the bottom of chamber 26. The tray 46 is easily slidable through the front of the incubator when the door 41 is open, being supported upon cleats 47, secured to the sides of the compartment 26. Preferably, there are two or more sets of these cleats at different elevations which permit the egg tray to be placed at different distances from the heating tank 21.

To operate this incubator, the tank 21 is filled with boiling water and the tray 46 containing the eggs inserted in the compartment 26. The sliding board 27 is moved to bring the perforations 30 and 31 into register and the door 41 closed. The water in the tank will maintain a constant temperature of the required degree in the incubator for about twelve hours, at the end of which time one fourth more or less, of the water is to be drawn off through the pipe 34 and the tank refilled with boiling water, the addition of which will maintain the temperature of the tank for twelve hours longer. Continuing this operation twice each day will insure an even regular temperature in the incubator. No other attention is required to control the heating apparatus, as the hot water in the tank can not exceed the maximum temperature of 212 degrees when introduced thereinto, nor can it be rapidly lowered by radiation or convection, there being no chance for radiation of heat except from the bottom of the tank and this radiation is used for hatching the eggs. The sliding board 27 is to be maintained at all times in position to insure registration of the perforations except during the period when it is necessary to cool the eggs.

When the chicks are hatched out they will drop through one of the openings in the front of the tray into the compartment or nursing room 26.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent, is:

An incubator comprising an outer casing and an inner casing, and having an intermediate casing separated from the inner and outer casings, by air spaces, a perforated partition forming an upper and a lower chamber on the interior of the inner casing, and equipped with a hot water tank filling the said upper chamber, an egg tray, removably mounted and adjustably supported within the lower chamber, a slidable perforated board in contact with the said partition and adapted to be operated from the exterior of the outer casing whereby the said perforations in the partition may be opened and closed to regulate the heat directed into the egg tray, tubes extending into the lower chamber for admitting air thereto, a tube establishing communication between the said chamber and one of the air spaces surrounding the same, and an outlet vent tube leading from said air space through the top of the said casing.

In testimony whereof I affix my signature in presence of two witnesses.

ALFRED E. BERGSTROM.

Witnesses:
 EMILE BARNEBY,
 WM. F. WINKELMANN.